No. 861,533. PATENTED JULY 30, 1907.
T. S. PEARSON & V. E. VAILE.
BAND CUTTER AND FEEDER FOR THRESHERS.
APPLICATION FILED APR. 16, 1906.

2 SHEETS—SHEET 1.

Witnesses:
Dow W. Vorhies
Stella Snider

Inventors
Thomas S. Pearson,
Victor E. Vaile,
By E. T. Silvius.
Attorney.

THE NORRIS PETERS CO., WASHINGTON, D. C.

No. 861,533.  
PATENTED JULY 30, 1907.
T. S. PEARSON & V. E. VAILE.
BAND CUTTER AND FEEDER FOR THRESHERS.
APPLICATION FILED APR. 16, 1906.
2 SHEETS—SHEET 2.
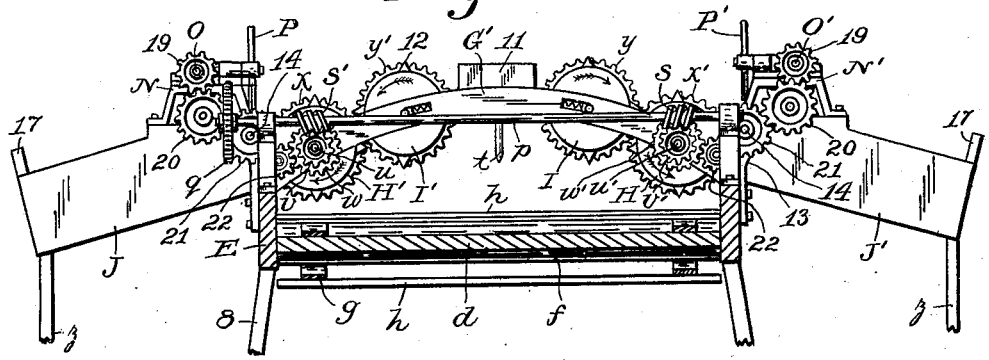
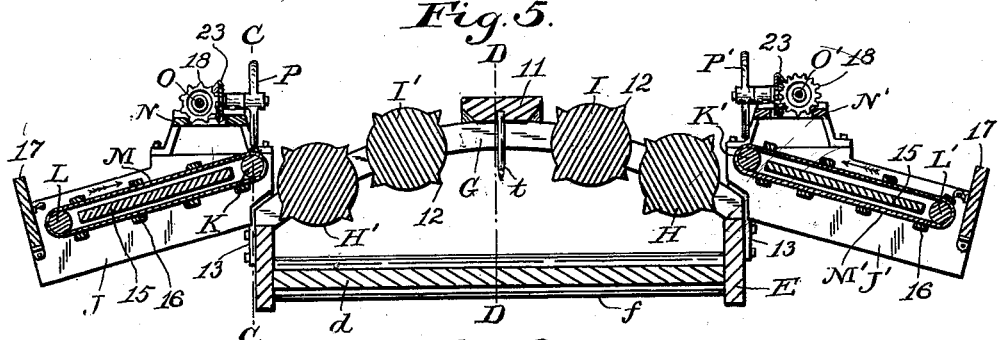
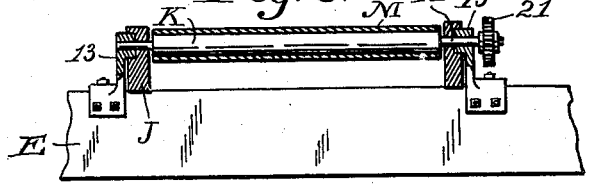
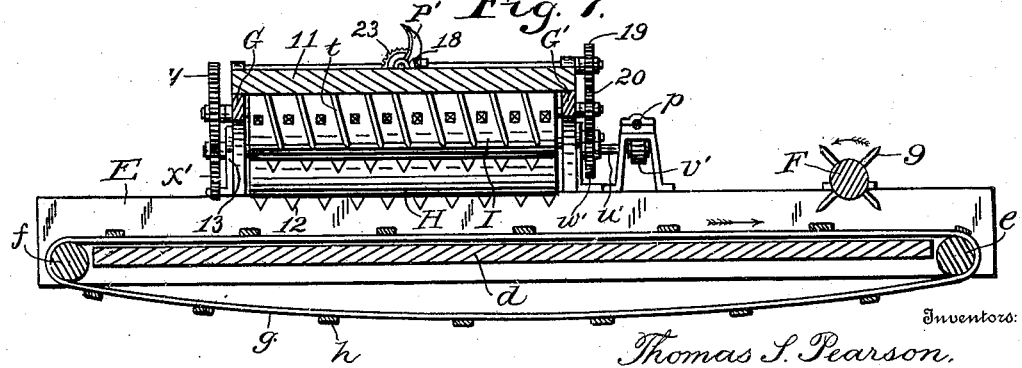
Witnesses:
Dow W. Vorhies.
Stella Snider.
Inventors:
Thomas S. Pearson,
Victor E. Vaile,
By E. T. Silvius,
Attorney.
THE NORRIS PETERS CO., WASHINGTON, D. C.

UNITED STATES PATENT OFFICE.

THOMAS S. PEARSON, OF CLAY TOWNSHIP, AND VICTOR E. VAILE, OF CENTER TOWNSHIP, HOWARD COUNTY, INDIANA.

BAND-CUTTER AND FEEDER FOR THRESHERS.

No. 861,533.　　　　Specification of Letters Patent.　　　　Patented July 30, 1907.

Application filed April 16, 1906. Serial No. 311,840.

*To all whom it may concern:*

Be it known that we, THOMAS S. PEARSON and VICTOR E. VAILE, citizens of the United States, residing in Clay township and Center township, respectively, in the county of Howard and State of Indiana, have invented new and useful Improvements in Band-Cutters and Feeders for Threshers; and we do declare the following to be a full, clear, and exact description of the invention, reference being had to the accompanying drawings, and to the letters and figures of reference marked thereon, which form a part of this specification.

This invention relates to automatic feeders and band cutters which are adapted to be used in connection with various types of machines that are designed to separate grain from the stalks on which the grain grows, the invention having reference more particularly to band cutters and feeders for grain separators or threshers of well-known construction.

Objects of the invention are to provide improved apparatus whereby the binding twine or bands which are used to form sheaves of grain may be cut, and whereby the sheaves may be broken up and spread out and fed evenly to the cylinder of the separator; to provide improved frames for the apparatus, and to provide feeders that may be relied upon to operate without becoming choked.

With the above-mentioned and minor objects in view the invention consists in feeding apparatus and band cutters mounted thereon, constructed and arranged in a novel and advantageous manner, which will be fully described hereinafter; and, further, the invention consists in the novel parts and the combinations and arrangements of parts as hereinafter particularly described and claimed.

Figure 1:
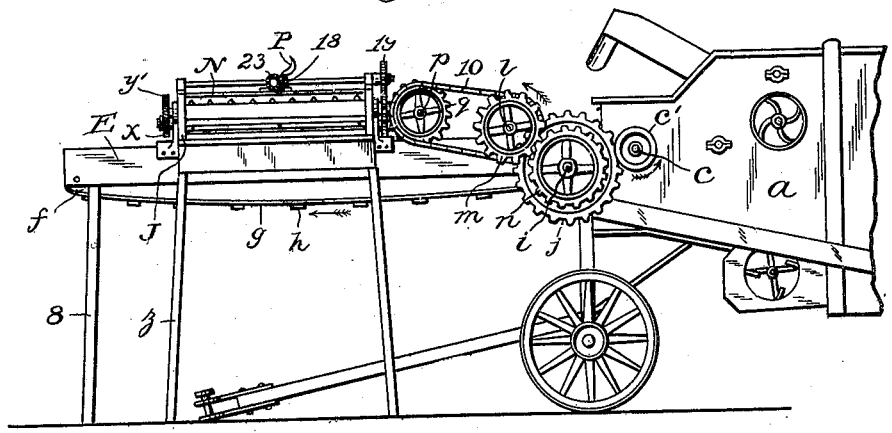
Figure 2:
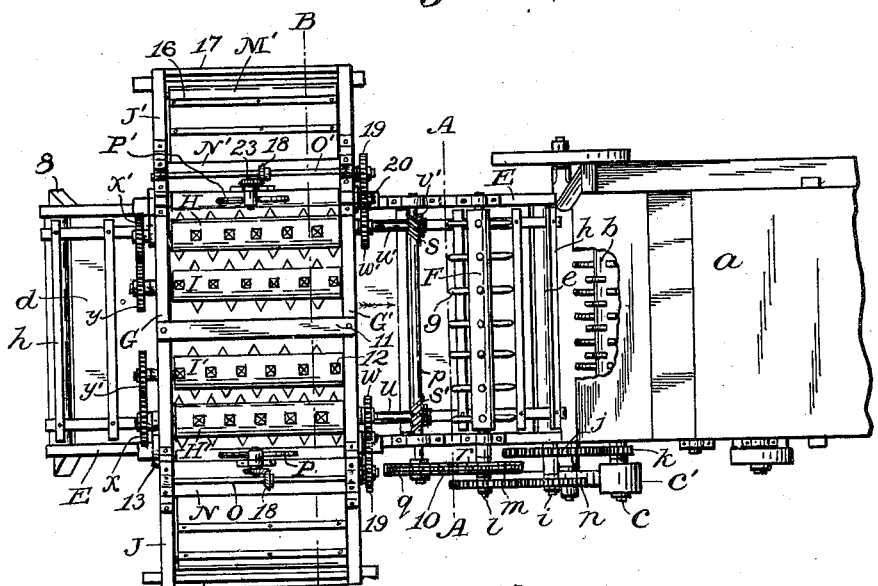
Figure 3:
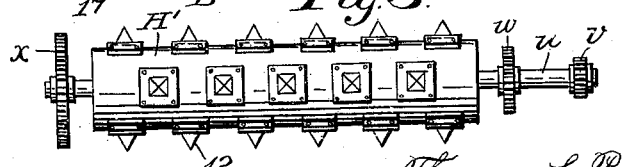

Referring to the drawings, Figure 1 is a side elevation of the feeding and band-cutting apparatus constructed substantially in accordance with the invention and shown in connection with a separator in fragmentary side elevation; Fig. 2, a top plan thereof; Fig. 3, an elevation of one of the main feed rolls detached from the machine; Fig. 4, a transverse sectional view of the apparatus on the plane of the line A—A in Fig. 2; Fig. 5, a fragmentary transverse sectional view on the plane of the line B—B in Fig. 2; Fig. 6, a fragmentary vertical sectional view on the plane of the line C—C in Fig. 5; and, Fig. 7, a fragmentary longitudinal vertical sectional view on the plane of the line D—D in Fig. 5.

Similar reference characters in the different figures of the drawings designate corresponding elements or features.

In the drawings $a$ designates a separator or thresher; $b$ the cylinder thereof; $c$, the cylinder-shaft, and $c'$ the drive pulley of the cylinder-shaft.

Practically embodied, the improvement comprises a main frame E which may be connected to a separator in any suitable manner so that one end of the frame may be supported by the separator frame near the cylinder $b$ to which the grain is to be fed, the other end having legs 8. The main frame comprises a table $d$ and side-members, there being rollers $e$ and $f$ mounted in the frame at the ends of the table, and belts $g$ having flights $h$ attached thereto extend about the rollers and across the table comprising parts of the main feeder conveyer, together with a feed roll F having fingers 9 and mounted rotatively on the main frame. The roller $e$ has a shaft $i$ to which is attached a gear wheel $j$ that is in mesh with a pinion $k$ which is secured to the shaft $c$ of the cylinder $b$, for driving the main feeder, and the roll F has a shaft $l$ to which is attached a gear wheel $m$ that meshes with a gear wheel $n$ which is secured to the shaft $i$ for driving the roll F.

A rotative shaft $p$ is mounted upon the frame E and has a sprocket wheel $q$ attached thereto on which is a chain belt 10 that is connected to a sprocket wheel $r$ which is secured to the shaft of the roll F, the shaft $q$ having a pair of worm wheels $s$ and $s'$ attached thereto.

The main feeder is provided with apparatus for cutting the bands of the sheaves of grain and delivering and spreading the grain in stalks on the conveyer of the main feeder, the apparatus comprising twin conveyers and band cutters arranged at opposite sides of the main feeder, although in some cases only one conveyer and band cutter may be provided. In constructing this apparatus, a pair of beams G and G', preferably curved as arches, are attached to the main frame E and span the table $d$ thereof, there being a cap beam 11 attached to the tops of the beams extending from one to the other beam, and a series of fingers $t$ are attached to the cap beam 11 and extend at inclined angles toward the table $d$ and the separator. Two pairs of feed rolls, H and I, and H' and I', are journaled on the beams G and G' and are provided with peripheral projections 12, the rolls I and I' being preferably spring-pressed each toward its companion roll. The roll H' has an extended shaft $u$ to which is secured a gear wheel $v$ that is in engagement with the worm $s'$, there being also gear wheels $w$ and $x$ attached to the shaft of the roll. The shaft $u'$ of the roll H also has a gear wheel $v'$ attached thereto that is in engagement with the worm $s$, other gear wheels $w'$ and $x'$ being attached also to the shaft of the roll H. A gear wheel $y$ is attached to the shaft of the roll I and meshes with the gear wheel $x'$, and a gear wheel $y'$ is attached to the shaft of the roll I' and meshes with the gear wheel $x$. The two pairs of feed rolls are designed to break up and scatter the grain stalks onto the main feeder conveyer.

Conveyer frames J and J' are connected to the sides of the main frame E, one at either side, and are provided with suitable legs z that support the outer ends of the frames, the inner ends of the frames being pivotally supported, so that the frames may be adjusted to different angles of inclination. Rollers K and L are journaled in the frame J, and similar rolls K' and L' are journaled in the frame J', the frames being provided with tables M and M'. Each frame, J and J' is pivoted by means of suitable brackets 13 that are attached to the main frame E, the shafts 14 of the rolls K and K' extending through the brackets and serving as pivots for the frames. Conveyer belts 15 having flights 16 are mounted on the pairs of the rolls of the frames J and J', these frames having end gates 17 for holding the sheaves temporarily until removed by the conveyer belts.

An elevated bridge N is mounted upon the frame J, and a shaft O is mounted rotatively on the bridge, upon the bridge there being also a band cutter P suitably mounted rotatively. On the frame J' is a similar bridge N' supported a shaft O' and also a band cutter P'. The band cutters may be variously formed, and preferably operate above the rollers K and K'. The shafts O and O' each have a bevel gear wheel 18 and also a spur wheel 19 attached thereto, the latter being at the ends of the shafts and engaged by idlers 20 that are mounted on the frames J and J', the idlers being engaged by gear wheels 21 that are attached to the shafts 14 of the conveyer rolls. Gear wheels 22 are mounted on the beam G' and connect the wheels 21 with the gear wheels w or w'. The band cutters are provided each with a bevel gear wheel 23 that engages the wheel 18 of the shaft O or O'.

In practical use when the separator is in operation the roller e will be driven by the gearing described, and the mechanism of the feeder and band cutters described above being connected with the roller e will consequently be driven also. The sheaves of grain are to be placed upon the conveyer belts of the frames J and J' and will thereby be carried under the shafts O and O' to the band cutters P and P' by which the binding twine will be severed, the sheaves also being divided somewhat by the knives of the band cutters. The straws or stalks will then pass between the pairs of feed rolls H and I, or H' and I', onto the conveyer that runs on the table d in loose spread out order, and in case of too rapid feeding momentarily, the accumulation of stalks would be forced against the fingers t, and would be retarded thereby so as to become spread out before advancing to the feed roll F which will assist the flights h in feeding to the cylinder b of the separator.

Having thus described the invention, what is claimed as new is—

1. A band cutter and feeder including a main feeder having a main frame, a pair of beams mounted on the main frame and having a cap beam provided with a plurality of fingers projecting toward the main feeder, a pair of feed rolls mounted on the pair of beams adjacently to the cap beam, a band cutter and a conveyer delivering to the feed rolls.

2. A band cutter and feeder including a main feeder having a main frame, a pair of beams mounted on the main frame and having a cap beam provided with a plurality of fingers projecting toward the main feeder, a pair of feed rolls mounted on the pair of beams adjacently to the cap beam, a conveyer delivering to the feed rolls, a band cutter and a feed roll provided with fingers and mounted on the main frame above the main feeder.

3. A band cutter and feeder including a main feeder having a main frame, a pair of beams mounted on the main frame and having a cap beam provided with a series of fingers projecting toward the main feeder, the pair of beams spanning the feeder, a plurality of pairs of feed rolls mounted on the pair of beams at opposite sides of the series of fingers and operatively connected with the main feeder, and a pair of conveyers connected to opposite sides of the main frame oppositely to the feed rolls and operatively connected with the feed rolls.

4. A band cutter and feeder including a main feeder having a main frame, a pair of beams mounted on the main frame and spanning the main feeder, a pair of feed rolls mounted on the pair of beams, a conveyer connected to the main frame and having a shaft mounted rotatively thereon, operative gearing between the rotative shaft and the conveyer, operative gearing between the conveyer and the main feeder, and a band cutter mounted above the conveyer and having operative connection with the rotative shaft.

5. A band cutter and feeder including a main feeder having a main frame, a pair of beams mounted on the main frame and provided with a cap beam having a series of fingers attached thereto projecting toward the main feeder, a plurality of pairs of feed rolls mounted on the pair of beams at opposite sides of the series of fingers and connected operatively with the main feeder, a pair of conveyers connected to the main frame and having each a shaft mounted rotatively thereon, operative gearing between the rotative shafts and the conveyers, operative gearing between the conveyers and the main feeder, and band cutters mounted above the conveyers and having operative connection with the rotative shafts.

6. A band cutter and feeder including a main frame provided with supporting legs, a main feeder and also two conveyers mounted on the main frame, each conveyer being provided with a supporting leg, a pair of arched beams mounted on the main frame, two pairs of feed rolls mounted on the pair of beams between the conveyers and above the main feeder, band cutters mounted above the conveyers, and gearing connecting the two conveyers, the two pairs of feed rolls and the band cutters with the main feeder.

7. Feeding apparatus including a main frame having a table, rollers mounted in the main frame, a belt or belts mounted on the rollers, flights attached to the belt or belts, a gear wheel attached to the shaft of one of the rollers, a feed roll provided with fingers and mounted on the main frame above the table, gearing between said gear wheel and the feed roll, a plurality of feed rolls having peripheral projections and mounted longitudinally above the table, gearing between said gear wheel and the plurality of feed rolls, a pair of conveyers connected to the main frame and conveying toward the plurality of feed rolls, gearing between said gear wheel and the pair of conveyers, band cutters mounted above the conveyers, and a plurality of fingers supported between two of the plurality of feed rolls.

In testimony whereof, we affix our signatures in presence of two witnesses.

THOMAS S. PEARSON.
VICTOR E. VAILE.

Witnesses:
TAYLOR JACKMAN,
JOSEPH E. VAILE.